3,229,777
METHOD OF TRANSPORTING WATER FROM A
WELL AS A SUBSTANTIALLY STABLE FOAM
Russell H. Rogers, deceased, late of Palos Park, Ill., by
Evelyn Rogers, executrix, Palos Park, Ill., and John T.
Foley, Atlanta, Ga., assignors to Swift & Company,
Chicago, Ill., a corporation of Illinois
No Drawing. Filed Mar. 22, 1961, Ser. No. 97,695
5 Claims. (Cl. 175—71)

The present invention relates in general to improved surface-active compositions. More particularly, the invention is directed to composition which impart exceptional foaming characteristics in aqueous solutions even if said solutions contain foam-suppressing materials such as, for example, the water normally encountered in the gas drilling of subterranean formations. Our invention is also directed to an improved method of transporting such aqueous solutions containing much of any soluble or dispersable foam suppressing constituent present out of columns such as the bore holes in drilling operations.

The use of air or other gas as a circulating material in the drilling of bore holes is highly advantageous in many applications. For example, pneumatic drilling is especially useful where shallow bore holes and shot holes for seismic prospecting are desired. This type of drilling can utilize lighter weight equipment than is required when liquid drilling fluids are utilized and does away with the preparation and utilization of the drilling muds. Furthermore, when drilling through certain formations, liquid drilling fluids may cause an undesired rupture in the formation due to the hydrostatic head of the liquid.

Despite the many advantages of air or gas drilling, there is a serious limitation which, in many instances, dissuades drilling operators from utilizing it. This limitation is the difficulty encountered when water-bearing formations are drilled. When this occurs, water enters the bore hole and gums up the drill cuttings. The mass then tends to coat the walls of the bore holes, the drill bit, and the pipes causing at least a reduction in the rate of drilling and in many instances, a complete plugging of the system.

It is, therefore, a principal object of our invention to overcome this limitation by providing an improved foaming agent for effectively transporting water out of columns such as wells. An additional primary object of our invention is to provide a composition which exhibits exceptional foaming properties when added to water and is therefore eminently suited for use in transporting water out of wells. A further object of our invention is to provide an improved method for transporting water from columns.

Additional objects if not specifically set forth will become apparent to those skilled in the art from the following description of our invention.

We have found that the addition to a column containing water of a small but effective amount of a certain novel foaming composition which we have discovered (hereinafter more fully described) will transport the water from the column. Thus, by practicing our invention, water that is encountered when drilling a well with gas through water-bearing formations will be transported out of the well along with any dissolved or dispersed materials therein. Moreover, when added to a well, as for example by adding a small amount of the agent to the compressed gas (usually air) used in the drilling operation, our specific foaming agent will transport water from the well when water-bearing formations are encountered even if the well contains one or more foam suppressing materials such as crude oils, clays, drill cuttings and various electrolytes. Indeed a very unexpected aspect of this phase of our invention lies in the discovery that the addition of small amounts of our novel composition to a column will transport water from a saturated salt solution therein (the salt usually being sodium chloride or calcium chloride and often mixtures thereof). While there are many foaming agents known, all do not produce a foam stable enough to remove water from a long tube such as an oil well and most will not foam water from a saturated salt solution. We have tested dozens of known foaming agents for this purpose and found less than 1% of these to possess this property and none of them to be as effective for this purpose as our novel composition.

Adding our composition in amounts as small as 0.01% by weight of the water present will very effectively transport the water out of the column as a stable foam. Smaller amounts are effective though to a lesser degree. Larger amounts up to about 0.2% by weight of the water present may be advantageously added. More than this amount is not generally required even when foam suppressing materials are present but can be effectively added up to the point at which viscosity becomes too high or cost too excessive. Generally speaking, up to about 5% of the composition, by weight of the water present, could be effectively used. The optimum amount of foaming agent to be used will vary directly with the variety and concentration of contaminants present in the well.

The novel composition which we have discovered to be especially useful for the purpose of transporting water out of columns such as wells is a mixture of certain polyethoxylated monohydroxy aliphatic alcohols with certain surface active materials comprising a mixture of a di-ethanolamide of a higher fatty acid and/or a higher fatty ester, a polyethanolamine salt of an alkyl aryl sulfonate and a soluble salt of a sulfated polyethoxylated alkylphenol having 8–10 carbons in the alkyl portion and from 3–12 moles of ethylene oxide in the ether portion. Excess free alkylolamine or alkali will usually be present because of the reactions involved in the preparation of these constituents. On our novel foaming composition the polyethoxylated monohydroxy aliphatic alcohol is present in the mixture in a major amount. We have found proportions of about 3.1 to about 4 parts of the polyethoxylated aliphatic alcohol to one part of the described surface active material to be especially effective.

More specifically, our composition contains a major amount of a water soluble compound of the following general type:

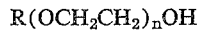

wherein R is an aliphatic hydrocarbon radical containing at least 8 carbons and $n$ is from about 9 to 40. Especially useful are those aliphatic hydrocarbon radicals derived from paraffinic and olefinic material. Suitable are those alkyl, and alkylene radicals of straight and branched chain hydrocarbons having 8–20 carbons and being substantially free of available hydroxyl and carboxyl groups. The above constituent is formed by reacting a mono-hydroxy unsubstituted straight or branched chain aliphatic alcohol having the hydroxyl group on a terminal carbon and having 8–20 carbons with ethylene oxide, using about 1.15–2 moles of ethylene oxide for every carbon present in the alcohol. Examples of materials suitable for reaction with ethylene oxide to form this constituent of our novel composition include the saturated and unsaturated aliphatic un-substituted monohydroxy primary alcohols such as but not limited to octyl alcohol, decanol, undecanol, lauryl alcohol, tridecyl alcohol, tetradecyl alcohol, pentadecyl alcohol, cetyl alcohol, heptadecyl alcohol, oleyl alcohol, octandecyl alcohol, nonadecyl alcohol, arachic alcohol, and various alcohol mixtures. Since it is important to avoid reactions at the double bond of an unsaturate, we preferably ethoxylate the saturated alcohols. Our preferred composition is prepared with the ethylene oxide-tridecyl alcohol condensation product.

The alcohol and ethylene oxide can be reacted in any effective manner. Some of these reaction products can be purchased. One method of producing the condensation product is to charge the desired alcohol containing an alkaline catalyst into a suitable reaction vessel. The alcohol-catalyst mixture is agitated and the vessel is heated to a temperature of between about 80–170° C. The ethylene oxide is charged into the mixture in a continuous stream until the predetermined desired average molecular weight of the condensation product, as measured by the ethylene oxide absorbed, has been achieved. When the reaction has reached completion, the unreacted gases are stripped off under vacuum after which the catalyst is neutralized and removed by filtration.

The detergent constituent of our compound present in minor proportions, will ordinarily comprise about equal parts by weight of diethanolamine, di- or tri-ethanolamine salt of an alkyl aryl sulfonate, di- or tri-ethanolamine salt of a sulfated polyethoxylated alkyl phenol having 8–10 carbons in the alkyl portion and from 3–12 moles of ethylene oxide in the ether portion, and a diethanolamide of a higher fatty acid and/or a higher fatty acid ester. Minor amounts of glycerine may be present due to fat hydrolysis. In general, the four major components of the detergent constituent of our foaming composition will be present in about the following percentages by weight of the constituent:

| | Percent |
|---|---|
| Diethanolamine | 25±3 |
| Di- or tri-ethanolamine salt of sulfated polyethoxylated alkyl phenol | 25±3 |
| Di- or tri-ethanolamine salt of alkyl aryl sulfonate | 25±3 |
| Diethanolamide of higher fatty acids and/or esters | 20±3 |

Any remaining percentage of this constituent is the glycerine split off in the various formation reactions.

Alkyl aryl sulfonic acids which are suitable for preparation of the di- or tri-ethanolamine salt of an alkyl aryl sulfonate are those having 9 to 14 carbons in the alkyl portions such as, but not limited to dodecybenzene sulfonic acid, tetradecylbenzene sulfonic acid, and dodecyl naphthalene sulfonic acid. The alkylolamine salts of these alkyl aryl sulfonic acids, are readily prepared by reacting, for example, diethanolamine, either alone or in combination with other products such as fatty acid diethanolamides, with the desired alkyl aryl sulfonic acid. The reaction may take ½ hour or more to go to completion and some trace amounts of diethanolamine sulfate and amine esters may be present in the final reaction product.

Octyl, nonyl and decyl phenols are useful in preparing the di- and/or tri-ethanolamine salts of sulfated polyethoxylated alkyl phenols. For example, the diethanolamine salts of the sulfated ethoxylated alkyl phenols employed as a part of the liquid detergent constituent of our composition can be prepared by condensing ethylene oxide with an alkyl phenol in the presence of an alkaline catalyst and subsequently treating the ethoxylated alkylphenol with sulfamic acid or other sulfating agent and finally forming the diethanolamine salt of the sulfated poly ether. Several of these ethoxylated alkyl phenols are commercially available. We prefer to use the nonylphenol-ethylene oxide condensate in preparing this constituent of our novel mixture. The preparation of compositions of this type is set forth in U.S. Patent No. 2,758,977, Knowles et al. If the ether condensates are purchased, the diethanolamine salt of the sulfated condensate is readily prepared by treating the ether condensate with about 10% excess of sulfamic acid at about 100–145° C. for about 4 hours followed by replacement of the ammonia evolved with diethanolamine.

The fatty diethanolamide component is prepared by heating and reacting higher fatty acids and/or their esters with an excess of diethanolamine. While glyceride esters of the fatty acids are preferred as the fatty acyl supplying element, the fatty acids or their monohydroxy aliphatic alcohol esters may be employed. The preferred fatty acyl supplying element is coconut oil or coconut oil fatty acids as well as fatty mixtures containing a substantial proportion of lauric acid and/or glyceryl esters thereof. While other fatty acids or oils may be employed the foam stability of the foam formed when utilizing our novel composition is somewhat less than where the coconut oil fatty acids are employed in producing the alkylolamide condensate.

The following examples are illustrative of our novel compositions but are not to be considered limiting as to their scope other than as is set forth in the appended claims:

EXAMPLE I

One mole of coconut oil was reacted with six moles of diethanolamine by heating under vacuum at 150–160° C. for approximately five hours. The reaction product which was obtained after cooling contained about 26% free diethanolamine. To 75 parts of this condensate 25 parts of dodecyl benzene sulfonic acid was added. The acid is about 88–98% active and contains small amounts of sulfuric acid, water, and unreacted dodecylbenzene. The mixture was agitated vigorously for about ½ hour or until neutralization of the sulfonic acid by the diethanolamine had occurred. The resulting product contained the approximate percentages of the components as follows:

| Composition: | Percent by weight |
|---|---|
| Coconut oil-diethanolamine condensate | 50–55 |
| Diethanolamine salt of dodecyl benzene sulfonate | 25–30 |
| Free diethanolamine | 5–10 |

EXAMPLE II 1 mole polyethoxylated nonylphenol, averaging about 5 moles ethylene oxide in the ether portion was reacted with about 1.1 moles sulfamic acid at about 100–145° C. After about 4 hours the acid group was neutralized with diethanolamine. Approximately 25 parts by weight of the salt of the ether sulfate so formed was mixed with about 25 parts by weight of free diethanolamine, 25 parts by weight of the diethanolamine salt of dodecyl benzene sulfonate and about 16 parts by weight of the diethanolamide of coconut oil. The remaining proportion of the composition formed consists substantially of glycerine split from the oil.

EXAMPLE III 200 grams of tridecyl alcohol were charged into a reaction vessel containing 0.5% by weight of sodium hydroxide as a catalyst. The alcohol-catalyst mixture was agitated and heated to about 160° C. Fifteen moles ethylene oxide were continuously metered into the mixture. The reaction was completed in about 5 hours, the unreacted gases stripped off under vacuum, and the catalyst neutralized and removed.

EXAMPLE IV

A mixture of ingredients was prepared containing 4 parts by weight of the reaction product of Example III, and one part of the surface active mixture prepared in Example II. A 6 foot tubular column having a 2½" inside diameter and containing 950 cc. water was used to test the water transporting effectiveness of our compositions. The water had dissolved therein about 4.0 g. sodium chloride, 1.0 g. sodium bicarbonate, 2.0 g. calcium sulfate, 2.0 g. calcium chloride, 1.0 g. magnesium chloride, 50 g. of a 10% bentonite suspension and 10 cc. No. 2 diesel fuel. 2.0 g. of our above mixture of ingredients was mixed into this solution and the mixture poured into the column. Air was introduced into the column at the bottom thereof, at the rate of 1.1 c.f.m. and after 20 minutes' aeration, 159 cc. of water in the form of a substantially stable foam had been carried out the top of the column. The test was repeated in the same water composition using the tridecyl ethylene oxide adduct alone, the surface active mixture of Example II alone, and different proportions of the mixture of ingredients of Examples II and III. Table I sets forth the data compiled:

*Table I*

| Agent Added | Percent Added, by Wt. H$_2$O | Vol. H$_2$O Recovered, cc. |
|---|---|---|
| Product of Ex. III | 0.2 | 68.0 |
| Product of Ex. II | 0.2 | None |
| 85% Product of Ex. III<br>15% Product of Ex. II | 0.2 | 16.0 |
| 80% Product of Ex. III<br>20% Product of Ex. II | 0.2 | 159.0 |
| 65% Product of Ex. III<br>35% Product of Ex. II | 0.2 | 60.0 |

EXAMPLE V

Soybean oil and an excess of diethanolamine was heated at 310° F. for 4 hours at 26" vacuum. 51.85% of the amide condensate thus formed and cooled to about 100° F. was mixed for about 15 minutes with 17.3% dodecyl naphthalene sulfonic acid. 19.0% of the triethanolamine salt of polyethoxylated octyl phenol was added to and the entire mixture agitated for about 15 minutes. To this mixture was added 11.85% diethanolamine. The entire batch was heated to 150° F. and mixed for ½ hour at atmospheric pressure. The temperature was maintained at about 150° F. and mixing continued at 5" vacuum for ½ hour at which time all the ammonia that had evolved had been driven off and replaced by diethanolamine.

EXAMPLE VI

Excess diethanolamine and tallow were heated to 320° F. for 6 hours at 26" vacuum. To 51.85% of the amide condensate thus formed was added 17.3% tetradecyl benzene sulfonic acid, 19.0% diethanolamine salt of polyethoxylated decyl phenol and 11.85% diethanolamine by the procedure outlined in Example V.

EXAMPLE VII

Polyethoxylated alcohols were prepared in accordance with the procedure of Example III using the following alcohols and amounts of ethylene oxide:

*Table II*

Mols ethylene oxide
- (a) Lauryl alcohol _____ 15
- (b) Tridecyl alcohol _____ 20
- (c) Lauryl alcohol _____ 20
- (d) Cetyl alcohol _____ 25
- (e) Oleyl alcohol _____ 28
- (f) Stearyl alcohol _____ 40
- (g) Octyl alcohol _____ 12

EXAMPLE VIII

Representative compositions were prepared using different combinations and proportions of polyethoxylated alcohols and other surface active compositions as follows:

| Sample | Composition |
|---|---|
| (A) | 350 parts product of Ex. VII (c).<br>100 parts product of Ex. V. |
| (B) | 310 parts product of Ex. III.<br>100 parts product of Ex. VI. |
| (C) | 375 parts product of Ex. VII (f).<br>100 parts product of Ex. II. |
| (D) | 400 parts product of Ex. VII (g).<br>100 parts product of Ex. II. |
| (E) | 400 parts product of Ex. VII (b).<br>100 parts product of Ex. II. |

Samples A–E in amounts of 0.01%, 1.0%, 0.5%, 0.2%, 2%, respectively, by weight of the water were each added to a column containing water having foam-suppressing agents therein (similar to that set out in Ex. IV). Compressed air was blown into the column and the effectiveness of the samples to transport water from the well was noted. All samples were very effective foaming agents, although a variation in effectiveness was noted, the samples containing the product of Ex. II producing the most stable foams.

Obviously, many modifications and variations of the invention as hereinbefore set forth may be made without departing from the spirit and scope hereof, and therefore only such limitations should be imposed as are indicated in the appended claims.

We claim:

1. In the method of transporting water from wells as a substantially stable foam, the improvement comprising: contacting the water in a well with a small amount of a composition containing 3.1–4 parts by weight, of a water soluble compound of the formula R(OCH$_2$CH$_2$)$_n$OH, wherein R is an aliphatic hydrocarbon radical of at least 8 carbons and $n$ is from about 9–40 and 1 part, by weight, of a mixture, in about equal proportions, of: a fatty diethanolamide, an alkylolamine salt of an alkylaryl sulfonate, an alkylolamine salt of a sulfated polyethoxylated alkylphenol having 8–10 carbons in the alkyl portion and 3–12 ethylene oxide groups in the ether portion, and diethanolamine; and circulating gas in the so-treated well.

2. In the method of transporting water from wells as a substantially stable foam, the improvement comprising: contacting the water in a well with at least about 0.01% by weight of the water, of a composition containing 3.1–4 parts by weight, of the reaction product of a monohydroxy aliphatic alcohol having a least 8 carbons with from about 1.15–2 moles of ethylene oxide per carbon atom in the alcohol, and 1 part, by weight, of a mixture of about 17–23% coconut oil diethanolamide, about 22–28% polyethanolamine salt of an alkyl benzene sulfonate having 9–14 carbons in the alkyl portion, about 22–28% polyethanolamine salt of a sulfated polyethoxylated alkylphenol having 8–10 carbons in the alkyl portion and 3–12 ethylene oxide groups in the ether portion, and about 22–28% diethanolamine; and aerating said so-treated well.

3. In the gas drilling of wells wherein water bearing formations are encountered, the improvement comprising adding to the well at least about 0.01% by weight of the water of a foaming agent consisting of 4 parts of a water soluble compound of the formula $$C_xH_{2x+1}(OCH_2CH_2)_nOH$$

wherein $x$ is from 8–20 and $n$ is from 9–40 and 1 part of a mixture of about 17–23% coconut oil diethanolamide, about 22–28% diethanolamine salt of dodecylbenzene sulfonate, about 22–28% diethanolamine salt of a sulfated nonylphenol-ethylene oxide condensate having 3–12 ethylene oxide groups, and about 22–28% diethanolamine; and circulating gas in said well whereby substantial amounts of said water will be transported out of said well as a substantially stable foam.

4. The method of claim 3 wherein $x$ is 13 and $n$ is 15–26.

5. In the method of transporting water from a well as a substantially stable foam, the improvement comprising adding to said well a foam producing amount of a composition containing 3.1–4 parts by weight of water soluble compound of the formula $R(OCH_2CH_2)_nOH$, where R is an aliphatic hydrocarbon radical of at least 8 carbons and $n$ is from 9–40 and 1 part by weight of a mixture in about equal parts by weight of: a fatty diethanolamide, an alkylolamine salt of an alkyl aryl sulfonate, an alkylolamine salt of a sulfated polyethoxylated alkylphenol, and diethanolamine.

References Cited by the Examiner

UNITED STATES PATENTS

| Re. 23,840 | 6/1954 | Vitale et al. | 252—152 |
| 1,970,578 | 8/1934 | Schoeller et al. | 260—458 |
| 2,758,977 | 8/1956 | Knowles et al. | 252—161 |
| 2,766,212 | 10/1956 | Grifo | 252—152 |
| 2,855,367 | 10/1958 | Buck | 252—138 |
| 3,073,387 | 1/1963 | Dunning et al. | 175—71 |
| 3,076,508 | 2/1963 | Lissant | 252—8.55 |

OTHER REFERENCES

Murray et al.: Water Still Poses Tough Problem in Drilling with Air, article in the Oil and Gas Journal, vol. 55, June 10, 1957, pages 105, 107, 110 and 111.

McCutcheon: Soap and Chemical Specialities, February 1958, pages 56, 61 and 62.

Randall et al.: Stearates, Foaming Agents Combat Water in Air or Gas Drilling, article in The Oil and Gas Journal, Nov. 3, 1958, pages 78 to 83.

Gray: Chemicals in Drilling Muds, article in The Oil and Gas Journal, vol. 56, December 15, 1958, pages 97. 175–71.

Schwartz et al.: Surface Active Agents and Detergents, published 1958 by Interscience Publishers Inc., New York, Vol. II, page 316.

Dunning et al.: Foaming Agents and Cure for Water Logged Wells, article in the Petroleum Engineer, November 1959, pages B28 to B33. 252—8.55.

JULIUS GREENWALD, *Primary Examiner.*